Dec. 20, 1927.
G. E. DUDLEY
VEHICLE WHEEL
Filed Nov. 21, 1925
1,653,348
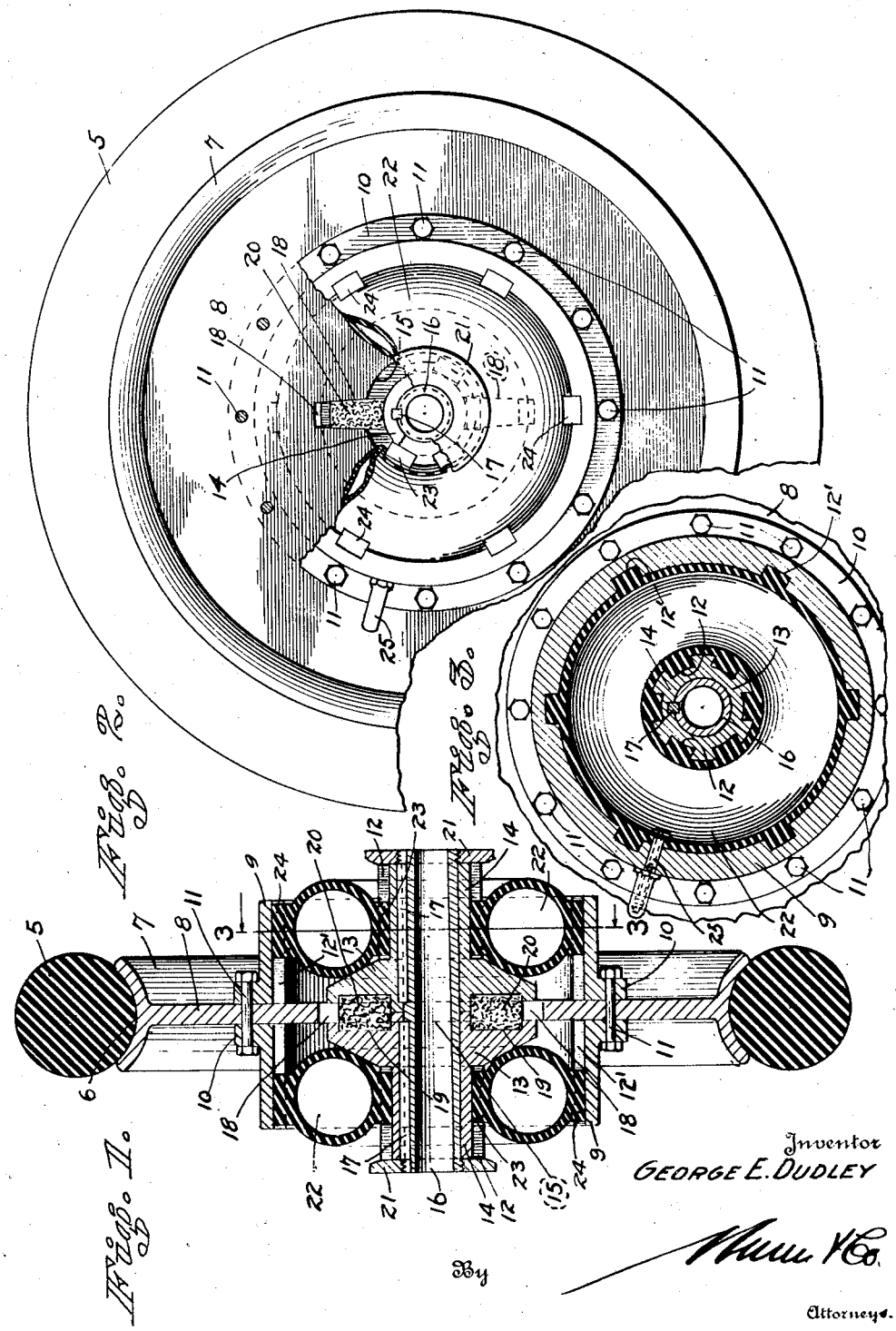
Inventor
GEORGE E. DUDLEY
By
Attorneys.

Patented Dec. 20, 1927.

1,653,348

UNITED STATES PATENT OFFICE.

GEORGE E. DUDLEY, OF ROSEVILLE, CALIFORNIA.

VEHICLE WHEEL.

Application filed November 21, 1925. Serial No. 70,623.

This invention relates to vehicle wheels and particularly to elastic wheels of the type preferably employing a solid cushion tread and a pneumatic hub structure, and has for some of its objects the provision of a wheel having maximum buoyant qualities; one which will be simple, inexpensive and reliable of action; and one wherein the various instrumentalities employed are freely accessible at all times in order that quick repairs and replacements can be made when desired.

Another object of the invention is to provide a wheel of this character which will properly function on the application of relatively low air pressures to the pneumatic tubes of the hub structure so that the wheel will have the easy riding properties of tires commercially known as the balloon type.

With the above and other objects in view which will appear as the nature of the invention is better understood, the same consists in the improved construction and novel arrangements of parts which will hereinafter be fully described and particularly pointed out in the claim.

In the accompanying drawings has been illustrated a single and preferred form of the invention, it being, however, understood that no limitations are necessarily made to the precise structural details therein exhibited, but that changes, alterations and modifications within the scope of the claim may be resorted to when desired.

Figure 1 is a transverse vertical section through the wheel;

Figure 2 is a view in side elevation of a portion of the wheel, parts broken away and parts shown in section for the purpose of clearness; and Figure 3 is a section on line 3—3 of Figure 1.

In carrying the invention into practice, I employ a cushion tread member 5 mounted in the channel 6 of a rim 7. This rim is carried by a vertical disk 8.

The hub structure comprises two annular members 9—9 located at the opposite sides of the disk 8 and provided with flanges 10 bolted at 11 to the disk 8 or otherwise suitably secured thereto in any well-known manner. Each of these annular members 9 is provided with a series of grooves 12' which extend parallel to the axis of the wheel and which are adapted to be alined radially with corresponding grooves 12 in the tubular extensions 14 of the respective separable elements 13, 13. These extensions are spaced apart from the coacting members 9—9 as clearly shown in Figures 1 and 3 of the drawing.

The disk 8 is provided with a central opening 15 through which an internally tapered axle box 16 is mounted, the same secured to the elements 13—13 by means of keys 17. Extending into the opening 15 at diametrically opposite points and formed in the disk 8 are wedge-shaped recesses 18. One of the elements 13 is provided on its inner face adjacent to one side of the disk 8 with grooves 19. The corresponding face of the other element 13 is provided with wedge shaped lugs or projections 20 formed of rawhide and adapted to slide in the wedge shaped recesses 18 so that there is relative movement between the axle of the wheel and the tread member 5.

The axle box 16 is of the usual type which will accommodate itself to the customary anti-friction rollers, and as illustrated, the ends of the axle box are threaded to accommodate themselves to clamp nuts 21 so that all of the separable parts of the hub structure and the axle box are firmly secured in position.

Located at the respective sides of the disk 8 are pneumatic tubes 22—22. These tubes are provided on their inner faces with lugs 23 accommodated in the grooves 12 of the tubular extensions 14 and on their outer faces the tubes are provided with similar lugs 24 which extend into the grooves 12' of the members 9. These tubes are provided with valves 25 whereby the tubes can be inflated as desired.

The lugs 23 and 24 and their coacting grooves in the tubular extensions 14 and members 9 serve to hold the tubes against circumferential movement.

It will be appreciated from the construction set forth herein that a wheel of this type may be used on either the front or rear axle of a vehicle.

It follows from the construction set forth that a wheel is provided which is a reliable substitute for the form of wheel employing a pneumatic tire at the rim. It is further apparent that by placing the tubes 22 at the hub of the wheel and in the positions shown and described, while arranging a solid cushion tread at the rim of the wheel, the attendant disadvantages of the well-known pneumatic tire are eliminated, while all of the good qualities are preserved. Also, from the construction herein set forth, the tubes 22 may be supplied with air at low pressure so that the wheel has the easy riding qualities of those employing tires commercially known as the balloon type.

Should it happen that either of the tubes 22 is damaged in use of the wheel, the construction herein set forth affords opportunity for easily disconnecting the tubes from the hub structure for replacement or repair purposes. It also follows that from the construction of the hub of my wheel the side walls of the tubes 22 will freely accommodate themselves to the action of pressure, forces or stresses applied thereto. These tubes are practically free to move in all directions except circumferentially.

I claim:

A wheel comprising a disk having an elastic tire at its rim, the disk having a central opening and radial communicating wedge shaped recesses, annular members secured to the respective sides of the disk, an axle box passing through the opening of the disk, elements through which the axle box passes, said elements being respectively located at the opposite sides of the disk and provided with non-metallic wedge shaped lugs free to slide in the recesses of the disk, and pneumatic tubes between the elements and said members.

GEORGE E. DUDLEY.